US012694444B2

(12) United States Patent
Ameisen et al.

(10) Patent No.: US 12,694,444 B2
(45) Date of Patent: Jul. 28, 2026

(54) SYSTEMS AND METHODS FOR BLOCK RATE MATCHING WHEN UPDATING A MACHINE LEARNING MODEL BASED FRAUD DETECTION SYSTEM

(71) Applicant: STRIPE, LLC, South San Francisco, CA (US)

(72) Inventors: Emmanuel Ameisen, South San Francisco, CA (US); Faye Ouyang, South San Francisco, CA (US); Seth Hendrickson, South San Francisco, CA (US); Andrew Birck, South San Francisco, CA (US)

(73) Assignee: STRIPE, LLC, South San Francisco, CA (US)

( * ) Notice: Subject to any disclaimer, the term of this patent is extended or adjusted under 35 U.S.C. 154(b) by 24 days.

(21) Appl. No.: 17/947,036

(22) Filed: Sep. 16, 2022

(65) Prior Publication Data

US 2024/0095741 A1 Mar. 21, 2024

(51) Int. Cl.
$G06Q\ 40/02$ (2023.01)
$G06Q\ 20/40$ (2012.01)
(52) U.S. Cl.
CPC ....... $G06Q\ 40/024$ (2025.08); $G06Q\ 20/4016$ (2013.01)
(58) Field of Classification Search
None
See application file for complete search history.

(56) References Cited

U.S. PATENT DOCUMENTS 11,961,084 B1 * 4/2024 Lauz ................... G06Q 20/4016
2014/0089193 A1 * 3/2014 Boding ................ G06Q 20/382
705/44

(Continued)

OTHER PUBLICATIONS

Li, Yanling, Nan Li, and Mingpei Yang. "Research on the Detection of Financial Fraud Using Data Mining Techniques." 2017 7th International Conference on Advanced Design and Manufacturing Engineering (ICADME 2017). Atlantis Press, 2017. (Year: 2017).*

(Continued)

*Primary Examiner* — Calvin L Hewitt, II
*Assistant Examiner* — Brock E Turk
(74) *Attorney, Agent, or Firm* — FINNEGAN, HENDERSON, FARABOW, GARRETT & DUNNER, LLP

(57) ABSTRACT

A method and apparatus for machine learning model (MLM) based fraud detection of transactions are described. The method may include determining a first block rate of a first MLM that scores transactions, wherein the fraud detection system blocks a transaction when a score generated for the transaction by the first MLM does not satisfy a first threshold value. The method may also include accessing a second MLM to be used by the fraud detection system for blocking future transactions. Furthermore, the method may include determining a second threshold value using a set of prior transactions input into the second MLM that results in a second block rate of the second MLM within a predetermined margin of the first threshold. The method may also include deploying the second MLM using the second threshold value for performing fraud detection of at least one new transaction.

15 Claims, 6 Drawing Sheets

100

(56) References Cited

U.S. PATENT DOCUMENTS

| 2017/0148027 | A1* | 5/2017 | Yu | G06Q 10/0635 |
|---|---|---|---|---|
| 2020/0126085 | A1* | 4/2020 | Roche | G06Q 20/102 |
| 2020/0226460 | A1* | 7/2020 | Bruss | G06Q 20/405 |
| 2022/0094709 | A1* | 3/2022 | Sharma | G06N 3/006 |
| 2023/0177512 | A1* | 6/2023 | Laptiev | G06Q 20/4016 |
| | | | | 705/44 |
| 2023/0186308 | A1* | 6/2023 | Babu | G06Q 20/108 |
| | | | | 705/44 |

OTHER PUBLICATIONS

Dal Pozzolo A, Boracchi G, Caelen O, Alippi C, Bontempi G. Credit card fraud detection: a realistic modeling and a novel learning strategy. IEEE transactions on neural networks and learning systems. Sep. 14, 2017;29(8):3784-97. (Year: 2017).*

* cited by examiner

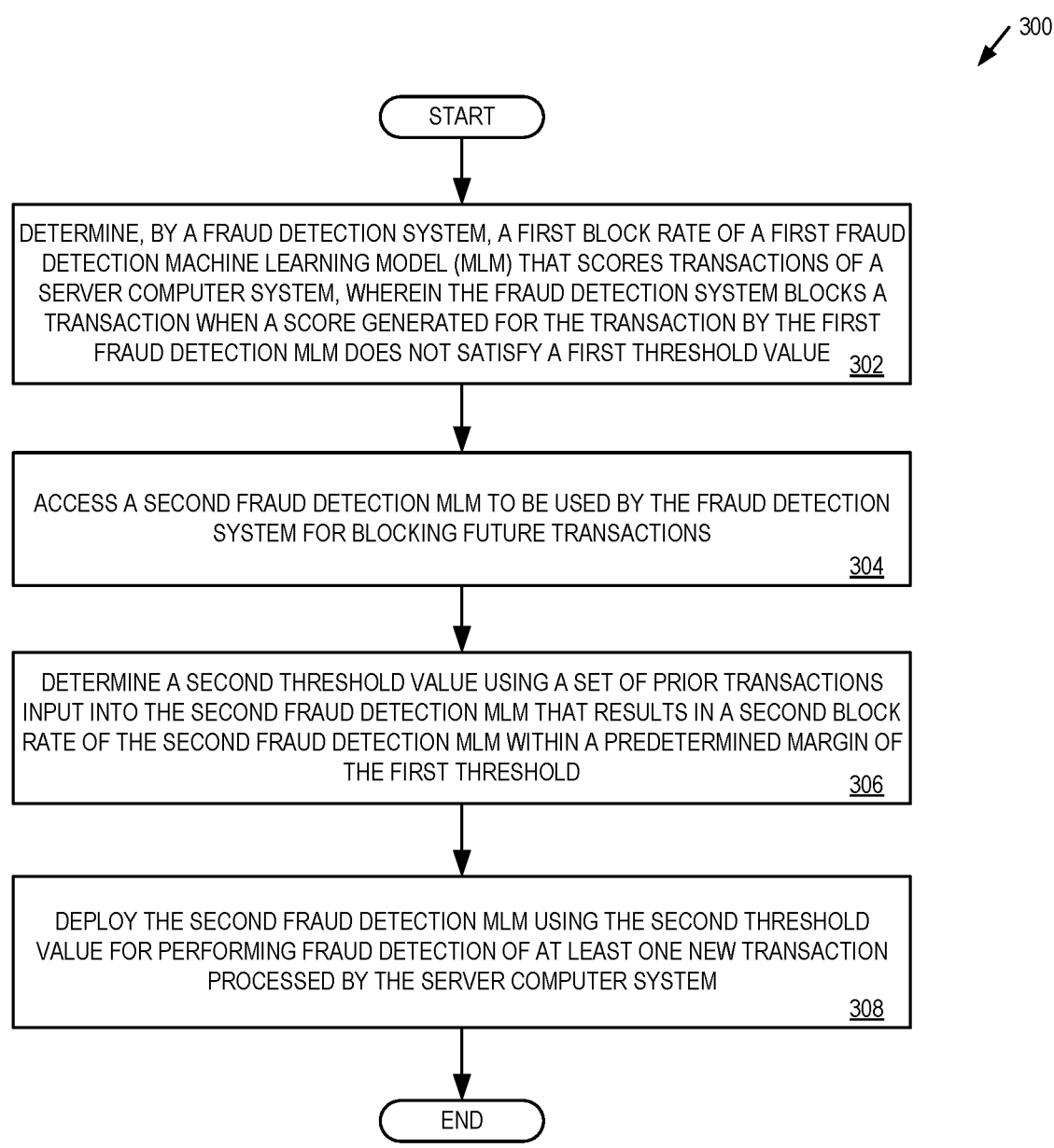

300

START

DETERMINE, BY A FRAUD DETECTION SYSTEM, A FIRST BLOCK RATE OF A FIRST FRAUD DETECTION MACHINE LEARNING MODEL (MLM) THAT SCORES TRANSACTIONS OF A SERVER COMPUTER SYSTEM, WHEREIN THE FRAUD DETECTION SYSTEM BLOCKS A TRANSACTION WHEN A SCORE GENERATED FOR THE TRANSACTION BY THE FIRST FRAUD DETECTION MLM DOES NOT SATISFY A FIRST THRESHOLD VALUE  302

ACCESS A SECOND FRAUD DETECTION MLM TO BE USED BY THE FRAUD DETECTION SYSTEM FOR BLOCKING FUTURE TRANSACTIONS
304

DETERMINE A SECOND THRESHOLD VALUE USING A SET OF PRIOR TRANSACTIONS INPUT INTO THE SECOND FRAUD DETECTION MLM THAT RESULTS IN A SECOND BLOCK RATE OF THE SECOND FRAUD DETECTION MLM WITHIN A PREDETERMINED MARGIN OF THE FIRST THRESHOLD
306

DEPLOY THE SECOND FRAUD DETECTION MLM USING THE SECOND THRESHOLD VALUE FOR PERFORMING FRAUD DETECTION OF AT LEAST ONE NEW TRANSACTION PROCESSED BY THE SERVER COMPUTER SYSTEM
308

END

FIG. 3

SYSTEMS AND METHODS FOR BLOCK RATE MATCHING WHEN UPDATING A MACHINE LEARNING MODEL BASED FRAUD DETECTION SYSTEM

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

To prevent fraudulent transactions, such as when a proffered payment is made with a stolen card number, a card number from an expired card, a spoofed card, etc., the commerce system may perform fraud detection for the transactions. Such fraud detection can include attempting to determine, based on parameters associated with a transaction, whether there is a likelihood that the transaction is fraudulent. For example, whether a card number is associated with past fraudulent transactions, whether the transaction amount or purchase location is a-typical for the card number, what IP address a remote transaction has originated from, etc. Thus, the fraud detection seeks to determine when one or more factors associated with the transaction indicate fraud, such as by employing machine learning techniques to analyze transaction data. The machine learning techniques used in fraud detection are based on one or more types of models and these models are trained to make fraud detection decisions based on training data. Thus, when the transaction parameters are input into the model, a certain number of transactions will be identified and then blocked as likely being fraudulent. Merchants therefore come to expect a certain number or percentage of the transactions being processed by the commerce system as being fraudulent.

When an update to the machine learning models for fraudulent transaction detection is made, for example by changing a type of one or more of the model(s) being used, updating the model(s), re-training the models based on new and/or different training data, or some combination thereof, the distribution and/or scoring generated by the updated/changed models are likely to be different than those of previously deployed fraudulent transaction detection model(s). Then, when the updated/changed models are put into production by the commerce system, the number or percentage of expected blocked transactions will likely change, challenging the expectations of the merchant. For example, a first set of one or more fraud detection model(s) may consistently detect that 0.1%, 1%, 5%, etc. of transactions are blocked. If a second model is deployed, the second model may block 1%, 2%, 10% of transactions, which may represent a significant increase or decrease in transactions being identified as fraudulent and thus blocked. Such a change in the number or percentage of blocked transactions may therefore disrupts a merchant's expectations and/or confidence with respect to the blocking of fraudulent transactions. For example, a significant decrease in the expected number of blocked transactions may indicate a drop in efficacy of fraud models protecting the merchant, whereas a significant increase in the expected number of blocked transactions may indicate an ongoing attack against the merchant and/or commerce system.

How to deploy the updated/changed fraudulent transaction detection model(s) that improve fraud detection without disrupting merchant expectations is a technical challenge. The deployment of new transaction fraud detection models to improve transaction fraud detection without altering expectations based on prior models, however, is a difficult technical challenge to be addressed.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3 is a flow diagram of one embodiment of a method for performing block rate matching for machine learning model based fraud detection of transactions.

DETAILED DESCRIPTION

Figure 1:
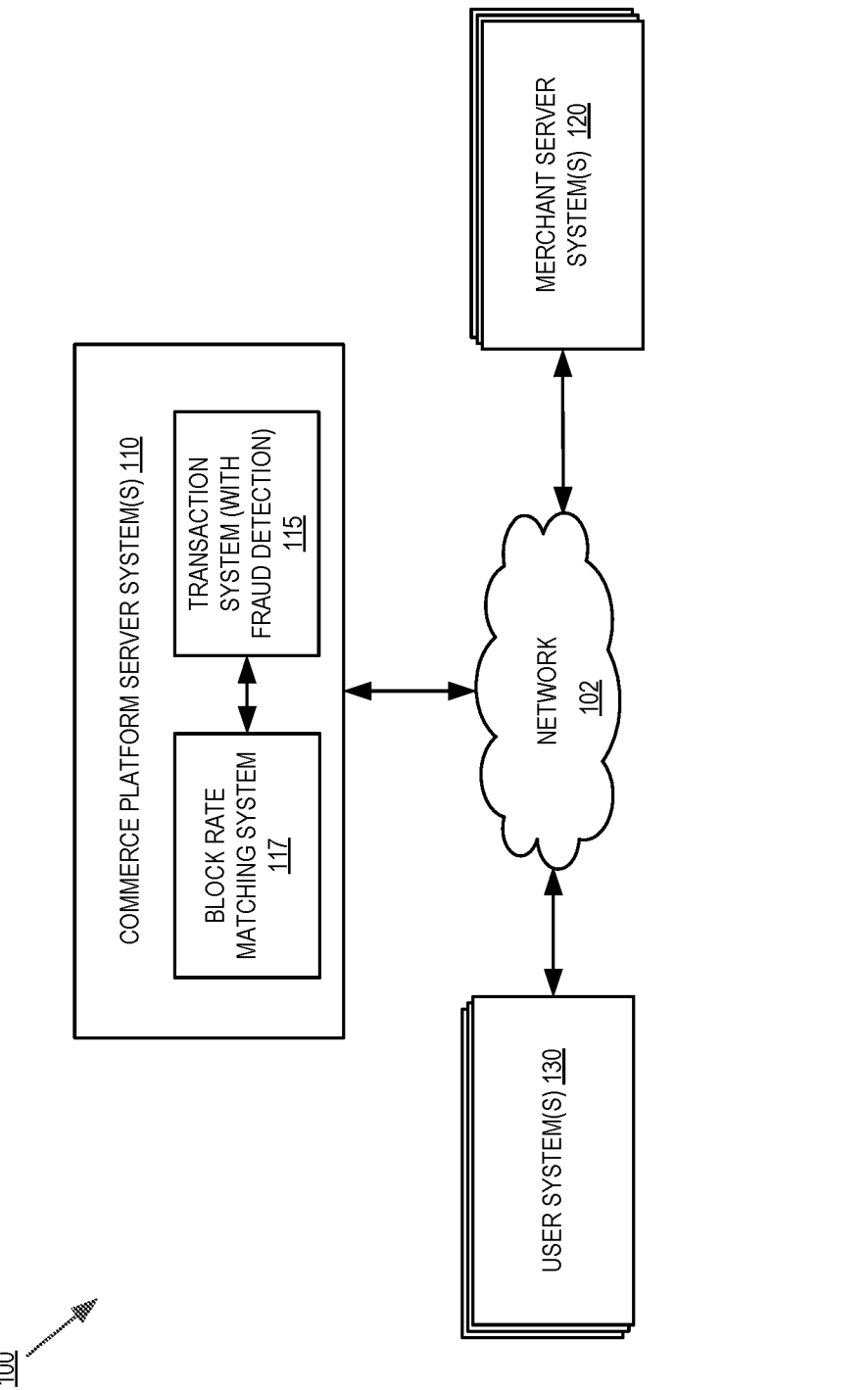
FIG. 1 is a block diagram of an exemplary system architecture for block rate matching when updating a machine learning model based fraud detection system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "accessing", "performing", "allowing", "generating", "executing", "filtering", "storing", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for block rate matching when updating a machine learning model based fraud detection system. In one embodiment, the system 100 includes commerce platform server system(s) 110, one or more merchant server system(s) 120, and one or more user system(s) 130. In one embodiment, one or more systems (e.g., system 120 and 130) may be mobile computing devices, such as a smart-phone, tablet computer, smartwatch, etc., as well computer systems, such as a desktop computer system, laptop computer system, server computing systems, etc. The commerce platform server system(s) 110 and merchant server system(s) 120 may also be one or more computing devices, such as one or more server computer systems, desktop computer systems, distributed computing systems, computing resources of a cloud processing system, etc.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraud during an interaction may use and/or extend the techniques discussed herein to identity based fraud detection, such media distribution platforms, gaming platforms, and other systems that provide remote transaction processing. However, to avoid obscuring the embodiments discussed herein, fraud detection during commercial transactions is discussed to illustrate and describe the embodiments of the present invention, and is not intended to limit the application of the techniques described herein to other systems in which fraud detection could be used.

The commerce platform server system(s) 110, merchant server system(s) 120, and user system(s) 130 may be coupled to a network 102 and communicate with one another using any of the standard protocols for the exchange of information, including secure communication protocols. In one embodiment, one or more of the commerce platform server system(s) 110, merchant server system(s) 120, and user system(s) 130 may run on one Local Area Network (LAN) and may be incorporated into the same physical or logical system, or different physical or logical systems. Alternatively, the commerce platform server system(s) 110, merchant server system(s) 120, and user system(s) 130 may reside on different LANs, wide area networks, cellular telephone networks, etc. that may be coupled together via the Internet but separated by firewalls, routers, and/or other network devices. In one embodiment, commerce platform server system(s) 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform server system(s) 110 provides various services to one or more merchants, such as to merchant server system(s) 120 and/or merchant user system(s) 130. In embodiments, the services may include financial processing services. For example, commerce platform server system(s) 110 may manage merchant accounts held at the commerce platform, run financial transactions from user system(s) 130 performed on behalf of a merchant server system, clear transactions, performing payouts to a merchant and/or merchant agents, manage merchant and/or agent accounts held at the commerce platform server system(s) 110, as well as other services typically associated with commerce platforms systems such as, for example, STRIPE™.

To prevent fraudulent transactions, in embodiments, commerce platform server system(s) 110 utilizes transaction system (with fraud detection) 115 (also referred to in the discussion of FIG. 1 as transaction system 115). As will be discussed in greater detail below, the transaction system 115 utilizes one or more machine learning models, such as neural network based models, tree based models, support vector machine models, classification based models, regression based models, etc., which may be referred to as machine learning models, ML models, or the like, to analyze attributes associated with a transaction, such as card number used in a transaction, email address used in the transaction, dollar amount of a transaction, etc., as well as fraud detection features generated by the commerce platform for use by the machine learning models when analyzing the transaction, such as a number of transactions on a card used in the transaction, a typical dollar amount of transactions for the card, whether the card number has been used with the email address in a prior transaction, etc. In embodiments, transaction system 115 takes as input the various transaction attributes, and makes a fraud based determination from the set of features. The fraud determination may be in the form of a score indicative of a confidence that the transaction is associated with fraud.

In embodiments, each merchant (e.g., each of merchant server system(s) 120) is associated with its own threshold for identifying a transaction as fraudulent based on the fraud score generated by the transaction system 115. The threshold may be user defined and set based on a given merchant's view on acceptability of risk of accepting fraudulent transactions. For example, a merchant may set a threshold setting a high confidence that a transaction is not fraudulent, whereas another merchant may set their own threshold setting a moderate confidence that a transaction is not fraudulent. Since ML model based scoring typically outputs a score (e.g., based on transaction attributes) between 0 and 1 (e.g., a higher score indicating a higher likelihood that a transaction is fraudulent), the score may be translated to a value between 0 and 100 enabling the merchant to set thresholds, such as 95%, 99%, etc. with regard to the required fraud score that will result in a transaction being identified by the ML model(s) scoring as a fraudulent transaction. When the merchant's set threshold is satisfied for a given transaction, the transaction can be blocked as having been determined to be fraudulent. Thus, for example, a first merchant's threshold may indicate only transactions scoring a likelihood of fraud 98% and above should be blocked as fraudulent, wherein a second merchant's threshold may indicate only transactions scoring a likelihood of fraud 95% and above should be blocked as fraudulent. Thus, each merchant is able to set their own threshold, which aligns with the merchant's aversion to risk, as well as the merchant's willingness to block transactions.

The total number of transactions blocked for a merchant given a fraud score threshold, in view of the total number of transactions processed for a merchant, is a block rate for that merchant given the merchant set threshold. The block rate is important to merchants as it indicates the number of transactions that are blocked, and thus prevented from processing, on the merchant's behalf. Merchant's will therefore set expectations of block rates by the transaction system 115 of the commerce platform server system(s) 110.

In embodiments, the ML model(s) used by transaction system 115 to detect fraudulent transactions may be periodically updated (e.g., retrained, tuned, updated to account for additional transaction attributes, one or more ML models changed to a different model type, as well as other changes) to, for example, improve the accuracy of fraudulent transaction detection, detect new forms of fraudulent activity, respond to new attack vectors, and otherwise improve the fraud detection of the ML model(s). These updates will change the distribution of how transactions are scored, and thus blocked given a merchant's set threshold. In other words, updates to the ML model(s) deployed by transaction system 115 may alter the historical and/or expected block rates for various merchant server systems 120. As a result, merchants may perceive increased fraud (e.g., in response to increased block rates), or lack of proper fraud protection (e.g., in response to decreased block rates).

In embodiments, block rate matching system 117 coupled with transaction system (with fraud detection) 115). Block rate matching system 117 is responsible for maintaining a block rate of a fraud detection system (e.g., system 214 of FIG. 2) of the transaction system 115 when one or more new model(s) are deployed by the fraud detection system. As will be discussed in greater detail below, after one or more fraud detection ML model(s) are updated, and prior to deployment by the transaction system 215, block rate matching system 117 adjusts the merchant's set threshold $(T_1)$ to an adjusted threshold $(T_2)$. Then, the adjusted threshold $T_2$ is used to determine when the updated fraud model scores indicate likely fraudulent transactions. However, as discussed in greater detail below, the block rate resulting from use of the adjust threshold $T_2$ by the new/updated fraud models ensures that the block rate provided by $T_1$ when used against prior fraud model scores, is maintained so that both merchant expectations are satisfied and the improved ML model(s) can be deployed to better detect fraudulent transaction activity. That is, a block rate for a merchant remains relatively the same when the new/updated ML model(s) are put into production at the transaction system 115 by using the adjusted threshold $T_2$ to determine when a fraud prediction score generated by the new ML model(s) should be judged as indicating fraud and thus blocking of a transaction.

In embodiments, block rate matching system 117 performs the threshold adjustment in an offline analysis of prior transactions. As will be discussed in greater detail below, block rate matching system 117 takes historical transaction data for each merchant over a period of time, and generates fraud scores for all or a sampling of transactions over that period of time using both the old ML model(s) (e.g., the ML model(s) currently in production at the transaction system 115) and the new ML model(s) (e.g., the adjusted ML model(s) that are to be put into production at a future time). A transaction block rate is then established for the transactions scored under the old ML model(s), by determining a total number of transactions blocked divided by the total number of transactions processed.

Block rate matching system 117 then generates a set of adjusted thresholds. In embodiments, the block rate matching system sweeps threshold values against a subset of transactions until a first adjusted threshold $(T_{2-1})$ providing a new block rate that matches the old block rate is found. The subset of transactions may be from a portion of time (e.g., the first i months of a set of j months of historical transactions), a portion of a number of transactions (e.g., the first x transactions of y total transactions), etc. The sweeping of threshold values may include an ordered adjustment of potential threshold values between test runs. Furthermore, a second adjusted threshold may be determined by sweeping a different time period of transactions (e.g., the transactions from i+1 to j months of historical transaction data, transactions x+1 through y of the transactions, a sampling from such periods, or other time periods). In some embodiments, the different time period not used to generate the first adjusted threshold is referred to as a held out set of transaction data.

Still further, a weighted adjusted threshold also maintaining the old block rate is found by sweeping one or more subset(s) of transactions using additional ML model predictors to weight the fraud detection scoring. In embodiments, the weighted adjusted threshold is determined from transactions from the same time period as the first adjusted threshold. For example, a trained card testing ML model (e.g., which generates a score indicative of whether a merchant system was undergoing card testing at the time of the transaction), a trained issuer decline prediction ML model (e.g., whether a payment instrument issuer is likely to decline a transaction given the transaction parameters), as well as other models that may be indicative of fraud and/or transaction failure, may be used to weight a transaction's score. For example, in an embodiment, a transaction may have an initial fraud score $s_1$, and then additional weightings (e.g., $w_1 \ldots w_n$) are applied to account for potential card testing and issuer decline prediction to generate an adjusted weighted score $s_w = s_1 * w_1 * \ldots * w_n$. In embodiments, more or less thresholds may be generated by block rate matching system 117 from historical data, various weightings, etc.

Block rate matching system 117 then tests the generated adjusted thresholds on the held out transaction data (e.g., the subset of transaction data corresponding to that not used to generate the first and weighted adjusted thresholds discussed above). That is, block rate matching system 117 applies each adjusted threshold to the historical held out transactions scored by the new ML model(s) to detect fraudulent transactions using the thresholds. The adjusted threshold providing a block rate that most closely matches the old block rate is then selected as the adjusted fraud detection threshold. In embodiments, a translation of the adjusted threshold is further generated so that fraud scores using the new ML model(s) and the adjusted threshold can be mapped to values consistent with the old threshold. The selected threshold is then able to be deployed with the new ML model(s) by the transaction system to use the new ML model(s) providing improved fraud detection and to maintain block rate consistency for the merchant.

In embodiments, the block rate matching system 117 performs this offline process for each merchant server system 120 to generate merchant-specific adjusted thresholds based on those merchant's transactions and the merchant's specifically selected threshold.

In some embodiments, prior to putting the new ML model(s) and the selected adjusted threshold into production, block rate matching 117 further performs shadow testing over a period of time and/or for a predetermined number of transactions. That is, shadow testing causes transaction system 115 to perform fraud detection scoring using the old ML model(s) and the old threshold for newly received transactions during the shadow testing period of time, and processes those transactions based on the old ML model(s) and old threshold. However, shadow scoring is generated using the new/updated ML model(s) and adjusted merchant thresholds and saved to a memory. Then, block rates can be calculated by block rate matching system 117 over the period of time/number of transactions for which shadow testing is performed. The block rates are then compared to determine whether the adjusted threshold applied to the fraud detection performed by the new ML model(s) holds (e.g., matches the block rate of the prior models and threshold) if put in production. That is, the new ML model(s) scoring and selected adjusted threshold is tested against live transactions and compared to the old ML model(s) and threshold to further ensure accuracy of the block rate matching with a selected threshold and new ML model(s). In some embodiments, the weighting used in generating the second adjusted threshold may also be employed during shadow testing of the selected adjusted threshold and transaction fraud scoring.

When the block rate during shadow testing is within a predefined accuracy (e.g., a percentage, number, statistical measure, etc.) of the old block rate, the new ML model(s) and thresholds are put into production at the transaction system 115. If the block rate is not within the predefined accuracy for one or more merchants, the thresholds may be recalculated using the techniques above but different transaction data and/or sent to a human analysist for manual adjustments. Once the remaining thresholds are recalculated and tested and/or manually adjusted, the new/updated ML model(s) and thresholds are put into production at the transaction system.

Thus, when the new/updated ML model(s) are put into production using the adjusted thresholds for determining which ML mode(s) scoring indicates transaction fraud, the block rate is maintained for each merchant server system 120. Thus, continuity across the ML model deployments is maintained ensuring merchant server system expectations are satisfied. The deployment of the new ML model(s) with the adjusted block rate threshold therefore solves the technical challenge of how to deploy new ML model(s) that both improve merchant system expectations while also improving transaction fraud detection. Furthermore, accuracy is ensured with this technical solution by performing both offline testing and live shadow testing against historical and new transactions to further ensure block rate matching consistency.

Figure 2:
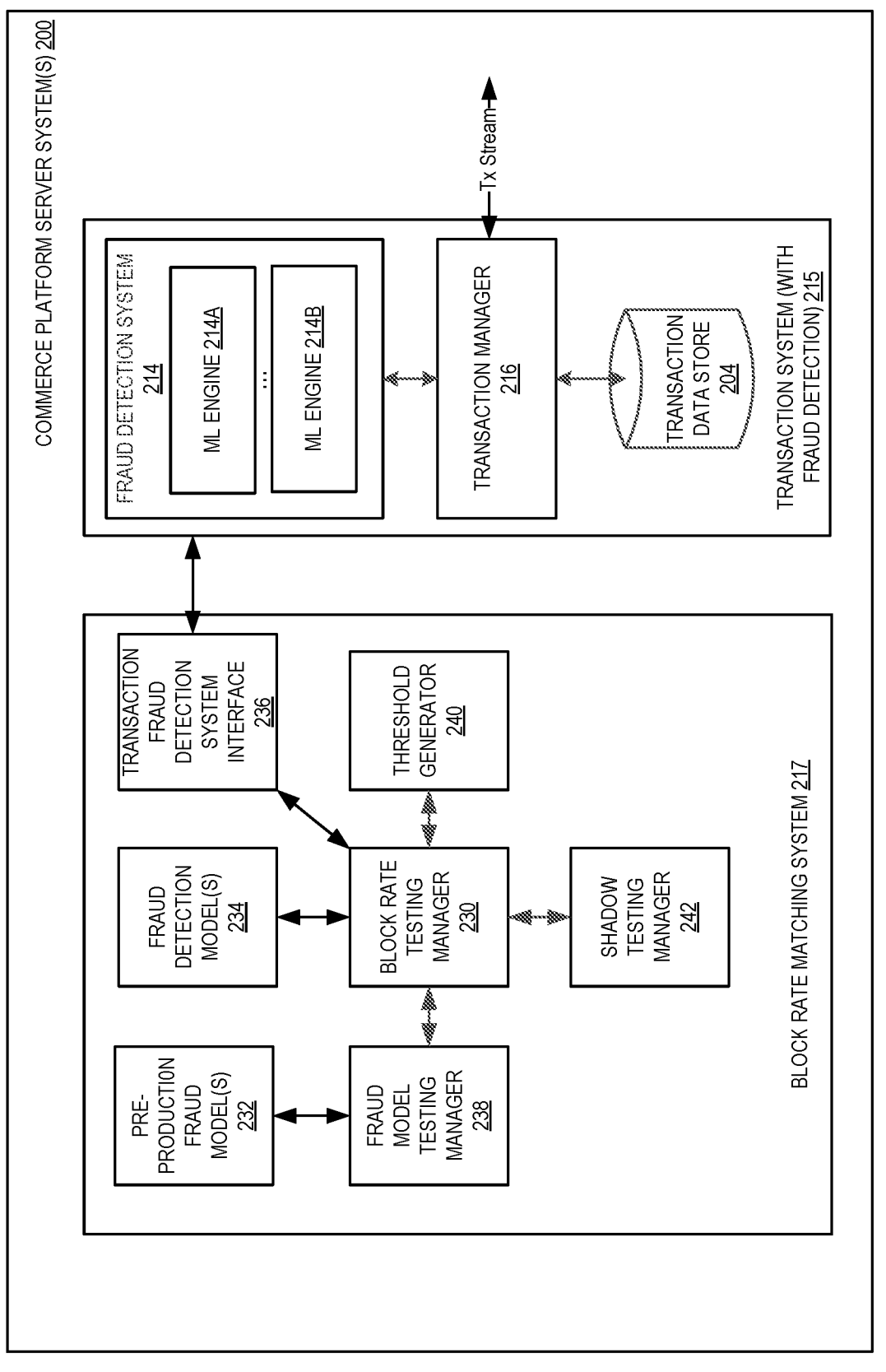
FIG. 2 is a block diagram of one embodiment of a commerce platform server system providing identity based fraud detection.

FIG. 2 is a block diagram of one embodiment of a commerce platform server system(s) 200 providing block rate matching when updating a machine learning model based fraud detection system. Commerce platform server system(s) 200 provides additional details for the commerce platform server system(s) 110 discussed above in FIG. 1.

In one embodiment, commerce platform server system(s) 200 includes a transaction system (with fraud detection) 215 and a block rate matching system 217. Other systems may be included in commerce platform server system(s) 200, but are not shown to avoid obscuring the discussed embodiments of the present invention. The transaction system (with fraud detection) 215 includes a fraud detection system 214, a transaction manager 216, and a transaction data store 204. The block rate matching system 217 includes a block rate testing manager 230, pre-production fraud model(s) 232, fraud detection model(s) 234 (e.g., production models), transaction fraud detection system interface 36, fraud model testing manager 238, threshold generator 240, shadow testing manager 242, and validation interface 244. In embodiments, each of these systems may be implemented using hardware, software, firmware, or a combination thereof.

Transaction manager 216 is an interface for processing transactions on behalf of merchant systems. In embodiments, transaction manager 216 interacts with a stream of transactions (e.g., purchases, returns, account creation, merchant management, etc.). A record of each transaction is then saved by transaction manager 216 in transaction data store 204. The record includes details of the transaction (e.g., transaction identifiers, transaction amount, transaction time(s), user identifiers, merchant identifiers, device identifiers, transaction parameters, as well as any other transaction data that may form part of the transaction). Transaction manager 216 is responsible for completing the transaction by interacting with third party system(s)(not shown), such as banking servers, card servers, third party data servers, etc. Thus, transaction manager 216 processes each aspect of the transaction until completion or rejection, and stores appropriate records within transaction data store 204.

Furthermore, in embodiments, transaction manager 216 may provide one or more transaction parameters to fraud detection system 214. Fraud detection system 214 includes one or more machine learning (ML) engines 214A through 214B trained to detect a likelihood that a transaction is fraudulent from a set of the transaction parameters. When a likely fraudulent transaction is detected, based on a set of transaction parameters, the transaction may be cancelled or blocked to prevent loss due to the transaction, and transaction manager 216 informed. A record of the blocking of transactions is also maintained in transaction data store 204.

In certain aspects, the ML engine(s) 214A and 214B implement at least one machine learning model selected from the following non-limiting examples: Random Forest, Classification and Regression Tree, boosted tree, neural network, support vector machine, general chi-squared automatic interaction detector model, interactive tree, multi-adaptive regression spline, and naïve Bayes classifier. In one embodiment, the models of ML engines 214A and 214B are an XGBoost tree-based model and a deep neural network model, however, other models or combination of models may be used. In the embodiments, the ML engines 214A and 214B can be used to determine, for a given transaction and transaction parameters, the likelihood that the transaction is fraudulent based at least in part on a prediction of the probability or likelihood of the transaction parameters being associated with fraudulent activity. This likelihood can be mapped to a standard scale (e.g., between 0.0 and 1.0), or other value, from which a determination of likelihood of fraud may be predicted.

To determine the probability or likelihood that a transaction is fraudulent, the ML engines 214A and 214B may create or utilize one or more models. In an embodiment, models can be constructed, trained, and refined to use feature sets associated with transaction parameters, external parameters (e.g., whether a merchant is undergoing card testing), user parameters (e.g., identity information for parties to a transaction), bank/issuer parameters (e.g., ML models that predict whether an issuer/bank will block a transaction), etc.

In embodiments, the models used by ML engine(s) 214A and 214B can at least partially be created offline using the various parameters for transactions and associated transaction records associated with prior fraud detection. In embodiments, ML engine(s) 214A and 214B can be trained using training data based on various parameters, and once trained may be put into production (e.g., use by the transaction manager during transaction processing). Furthermore, ML engine(s) 214A and 214B may be replaced and/or refined over time and trained based on past or future transactions for which no fraud was detected and no fraud existed, no fraud was detected but fraud did exists, fraud was detected and no fraud existed, fraud was detected and fraud did exist. In embodiments, such training data may be gathered from transaction data store 204. In embodiments, one or more ML training techniques appropriate for a given model may be executed by ML engine(s) 214A and 214B periodically as new/additional training data becomes available, and/or as new/updated models are selected.

In some embodiments, a Random Forest technique, such as XGBoost may be used in determining whether a transaction is likely to be fraudulent based on transaction parameters. Random forests can be an ensemble learning method for classification, regression and other tasks, that operate by constructing a multitude of decision trees at training time and outputting the class that is the mode of the classes (e.g., classification) or mean prediction (e.g., regression) of the individual trees. As an ensemble method, Random Forest can combine one or more 'weak' machine-learning methods together. Random Forest can be used in supervised learning (e.g., classification and regression), as well as unsupervised learning (e.g. clustering). The random forest approach may be used in binary classification mode in which the probability of that given transaction is fraudulent based on a feature set is mapped to between 0 and 1. Using Random Forest, three phases of model construction and evaluation can be employed: testing, training, and prediction. By way of example, a testing phase may be employed in which historical data, such as all transactions completed in a prior time period, is used to make a model. Once validated, the models may be placed into production, to predict on new or live transactions whether the transactions' parameters indicate the probability or likelihood of a fraudulent transaction. As discussed herein, the prediction or score may be compared to a merchant's threshold for determine whether a transaction should be classified as fraudulent.

In embodiment, ensemble methods may also be provided in embodiments, such as combining ML analysis performed by ML engines 214A and 214B. In statistics and machine learning, ensemble methods can use multiple ML model analysis techniques to obtain better predictive performance than could be obtained from any of the constituent learning algorithms. In an example, two models are generated and combined to create one prediction, with one model using the XGBoost technique and one model using a deep neural network (DNN) technique. However, other and additional models may be used including, but not limited to, regular random forest, one balanced random forest, support vector machine, etc. Each is trained to predict the probability or likelihood of a given transaction being fraudulent using, for example, transaction parameters, card testing parameters, issuer/bank parameters as well as other parameters, as discussed herein. For example, five models can then be ensembled together to deliver a single result that can have more power to detect fraudulent transactions, and provide a better prediction accuracy than any one model individually. In some embodiments, the predictions of the models may be weighted (e.g., a model's score adjusted using the output of one or more other models), combined using conditional probabilities on permutations, using a purely Bayesian methodology, and/or using cross-validation, etc.

After training of the models used by ML engines 214A through 214B, transaction manager 216 may employ fraud detection system 214 during transactions to use the ML engines 214A through 214B to predict whether an incoming transaction is likely fraudulent. As discussed above, transaction manager 216 may pass certain transaction parameters to fraud detection system 214. Fraud detection system scores the parameters, which are compared to a merchant threshold associated with the transaction, and the transaction is either allowed or blocked.

Each merchant server system sets its own fraud threshold, has its own transactions, and therefore forms its own block rate (e.g., block rate$_{merchant}$ i=$\Sigma$(blocked transactions$_{merchant}$ i)/$\Sigma$(total transactions$_{merchant}$ i). Each merchant forms an expectation of their given block rate, and thus when a fluctuation occurs, the merchant may become concerned. When, new fraud detection techniques (e.g., new ML models, engines, training, etc.) are generated, the new fraud detection techniques may disrupt the merchant's expectation with respect to block rates. Therefore, in embodiments, block rate matching system 217 is employed to ensure a consistent block rate when new/updated fraud detection techniques are put into production.

In embodiments, transaction fraud detection system interface 236 communicates with transaction system 215, and with fraud detection system 214 to detect when new fraud model(s) are being developed. For example, a new ML model may be trained for deployment to one or more ML engine(s) 214A or 214B, an existing model may be retrained on new training data, or a combination. Before these new/updated models are put into production, they are accessed as pre-production fraud model(s) 232. Existing models are also accessed as the production fraud detection model(s) 234. Block rate testing manager 230 then uses the pre-production and existing fraud models to generate associated block rates, as discussed below.

In an embodiment, fraud model testing manager 238 accesses historical transaction data for each merchant from transaction data store 204 via interface 236. In embodiments, the historical data is for a period of time, such as for example a prior three months of transactions. Then, fraud model testing manager 238 is able to feed the historical transaction data (or a sampling of the historical transaction data) into the fraud detection model(s) 234 to get a transaction fraud score. Each merchant's set threshold is then used to determine whether tested transactions should be blocked based on the scoring of fraud detection model(s) 234. The total of blocked transactions compared to the total tested transactions forms the existing block rate for each merchant, which corresponds to the merchant's set threshold for judging fraud using the existing/production fraud models (e.g., those currently deployed by fraud detection system 214).

Fraud model testing manager 238 then uses the historical transaction data to generate fraud scores using the pre-production fraud model(s) 232. That is, the new/retrained model(s) score the same transactions and generate their own scores.

Because the merchant's set threshold likely will not ensure a matching block rate between the production and pre-production models, threshold generator 240 generates a set of candidate thresholds. In embodiments, a first candidate threshold is generated from a subset of the historical transactions (e.g., a first two months of a three month period of historical transaction data). The first candidate threshold is generated by threshold generator by sweeping different threshold values until the first candidate threshold achieves a block rate for the subset of historical transactions that matches the existing block rate. The sweeping may be a random, deterministic, or ordered testing of threshold values over the historical transaction fraud scores, such as a database table join on an equality of proportion condition, which is configured to efficiently obtain the first candidate threshold.

In embodiments, a second candidate threshold is generated in a similar fashion to that of the first candidate threshold, except a different subset of historical transactions is used (e.g., the last month of the three-month period of historical transaction data). Again, the threshold generator 240 sweeps different threshold values over the scores of the different subset of historical transactions until the second candidate threshold achieves a block rate for the different subset of historical transactions that matches the existing block rate.

In some embodiments, a third candidate threshold may be generated by threshold generator 240. In this embodiment, either subset of historical data may be used for transaction scoring when generating the third candidate threshold. In embodiments, the weighting includes weights generated from transaction parameters input into one or more additional machine learning models (e.g., model(s) 234). Such models, as discussed herein, may be related to fraud detection, such as models that predict card testing, models that predict issuer/bank declines, as well as other model(s). Then, the sweeping of threshold values is performed against the weighted scores until the third candidate threshold achieves a block rate for the associated subset of historical transactions that matches the existing block rate.

In embodiments, other candidate thresholds may be generated as discussed herein based on different time periods, different fraud score weightings, etc.

Fraud model testing manager 238 then uses the candidate thresholds to test against one or more subsets of historical transaction records to determine which of the candidates provides a closest block rate to the existing block rate. In some embodiments, a new subset of historical data and/or sampling may be used to test the block rates achieved by the candidate thresholds and the pre-production model(s) 232. In other embodiments, one or more of the subsets of historical data discussed above may also be used. In either embodiment, the candidate threshold providing a closest block rate to the existing block rate is selected as the fraud threshold for use when the pre-production fraud model(s) are moved to production models (e.g., deployed by fraud detection system 214).

Furthermore, as discussed above, each merchant is associated with its own threshold, and thus the candidate threshold generation, testing, and selection is performed for each merchant system for which fraud detection is being used. Furthermore, in embodiments, a mapping is created that maps the value of the merchant selected threshold to the value of the new threshold (e.g., selected candidate threshold). Then, merchant's may be shown their set threshold by reverse mapping the selected threshold, when, for example the merchant selects to view fraud blocking scores of transactions, see their thresholds, or otherwise interact with the fraud detection system 214.

In some embodiments, after candidate threshold selection is performed, the pre-production fraud models are moved by block rate testing manager 230 to production and deployed by fraud detection system 214. In other embodiments, shadow testing manager 242 performs shadow testing during new/live transactions. That is, candidate threshold selection is completed, and prior to deployment of the new models, new/live transactions continue to be scored for an additional period of time using the existing ML models and judged against the existing merchant thresholds. That is, a status quo scoring/blocking is maintained. However, during this additional period of time, shadow testing manager 242 applies the selected candidate thresholds to the scores generated by the pre-production fraud model(s) 232. Then, for the new/live transactions, a further comparison of block rate is performed to determine whether block rate achieved by selected candidate thresholds continues to match the existing merchant block rates. In an embodiment, when a selected candidate threshold achieves a block rate that is within a predetermined amount (e.g., x %, y standard deviations, etc.) of the existing block rate, then the candidate value and new models may be moved to production. For selected candidates that do not satisfy this test, however, either re-selection or human intervention may be employed to set revised selected candidates. In embodiments, the shadow testing performed by shadow testing manager 242 is an added safeguard against deployment of selected candidate thresholds that will impact merchant expected block rates, and addresses an additional technical challenge of whether a selected block rate threshold will apply to new/live transactions which may change how attacks are encountered, how new forms of fraud are manifesting, etc. The shadow testing technique set forth above therefore ensures consistent block rates for new ML model(s) against current transactions.

FIG. 3 is a flow diagram of one embodiment of a method 300 for performing block rate matching for machine learning model based fraud detection of transactions. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform server system 110 or commerce platform server system 200).

Referring to FIG. 3, processing logic begins determining, by a fraud detection system, a first block rate of a first fraud detection machine learning model (MLM) that scores transactions of a server computer system, wherein the fraud detection system blocks a transaction when a score generated for the transaction by the first fraud detection MLM does not satisfy a first threshold value (processing block 302). As discussed herein, MLMs (e.g., neural networks, XGBoost, a support vector machine, a regression based model, and other MLMs as well as ensemble methods) are trained on past fraud detections of the server computer system, and transaction parameters associated with those transactions. The MLMs output a score, typically from 0 to 1 that is indicative of the likelihood that the MLM predicts the transaction to be fraudulent. Then, a fraud detection threshold, which may be set or selected by a user system, is compared to the score to determine if fraud is detected. For example, a first transaction's fraud score may be 0.89 and a second transaction's fraud score may be 0.91. If a fraud detection threshold associated with the user is 0.9, then the second transaction would be blocked, and the first transaction would be allowed to proceed. A certain amount of transactions will be fraudulent, and thus the block rate is the number of fraudulent transactions divided by the total number of transactions processed.

Processing logic accesses a second fraud detection MLM to be used by the fraud detection system for blocking future transactions (processing block 304). The second fraud detection MLM may be a new MLM, a retrained MLM, a modified version of an existing MLM, or some other change, update, revision to an existing MLM that will improve fraud detection in view of, for example, new attack patterns, new attack origin locations, new attack parameters, and so on. Typically, the second fraud detection MLM represents an improved MLM, either in terms of fraud detection accuracy, efficiency, or a combination thereof and will improve the overall fraud detection performed by processing logic. However, the second fraud detection MLM will usually not have the same decision distribution of the first MLM. That is, the fraud detection rate may differ, and may differ significantly. Where fraud detection is performed for a user, such as a merchant, the user will come to expect a certain block rate, with significant variations indicative of certain conditions, such as attacks, internal problems, or other undesirable scenarios. These undesirable scenarios occur despite the improved fraud detection enabled by the new MLM.

In embodiments, to ensure a consistent block rate, to satisfy user expectations, to maintain a level of consistency of a fraud detection system, and to enable deployment of the new MLM providing improved fraud detection, processing logic determines a second threshold value using a set of prior transactions input into the second fraud detection MLM that results in a second block rate of the second fraud detection MLM within a predetermined margin of the first threshold (processing block 306). That is, in embodiments, processing logic determines a second, different threshold, that when applied to the fraud scores of transactions generated by the second fraud detection MLM results in a block rate within the predetermined margin. Such a second threshold value will therefore maintain a consistent block rate when applied with the second MLM as when the first threshold is applied with the first MLM.

Processing then logic deploys the second fraud detection MLM using the second threshold value for performing fraud detection of at least one new transaction processed by the server computer system (processing block 308). In embodiments, the second fraud detection MLM and second threshold are moved to production to perform fraud detection scoring, and consequently fraud detection decision making based on the second fraud detection threshold, on live transactions. Since the second fraud detection threshold when used with the second MLM maintains a consistent block rate, the user's expectations are maintained, the fraud detection consistency is maintained, and the improved fraud detection MLM is deployed. Therefore, improved fraud detection is enabled that maintains user expectations to ensure a smooth transition to the new and improved MLM.

Figure 4A:
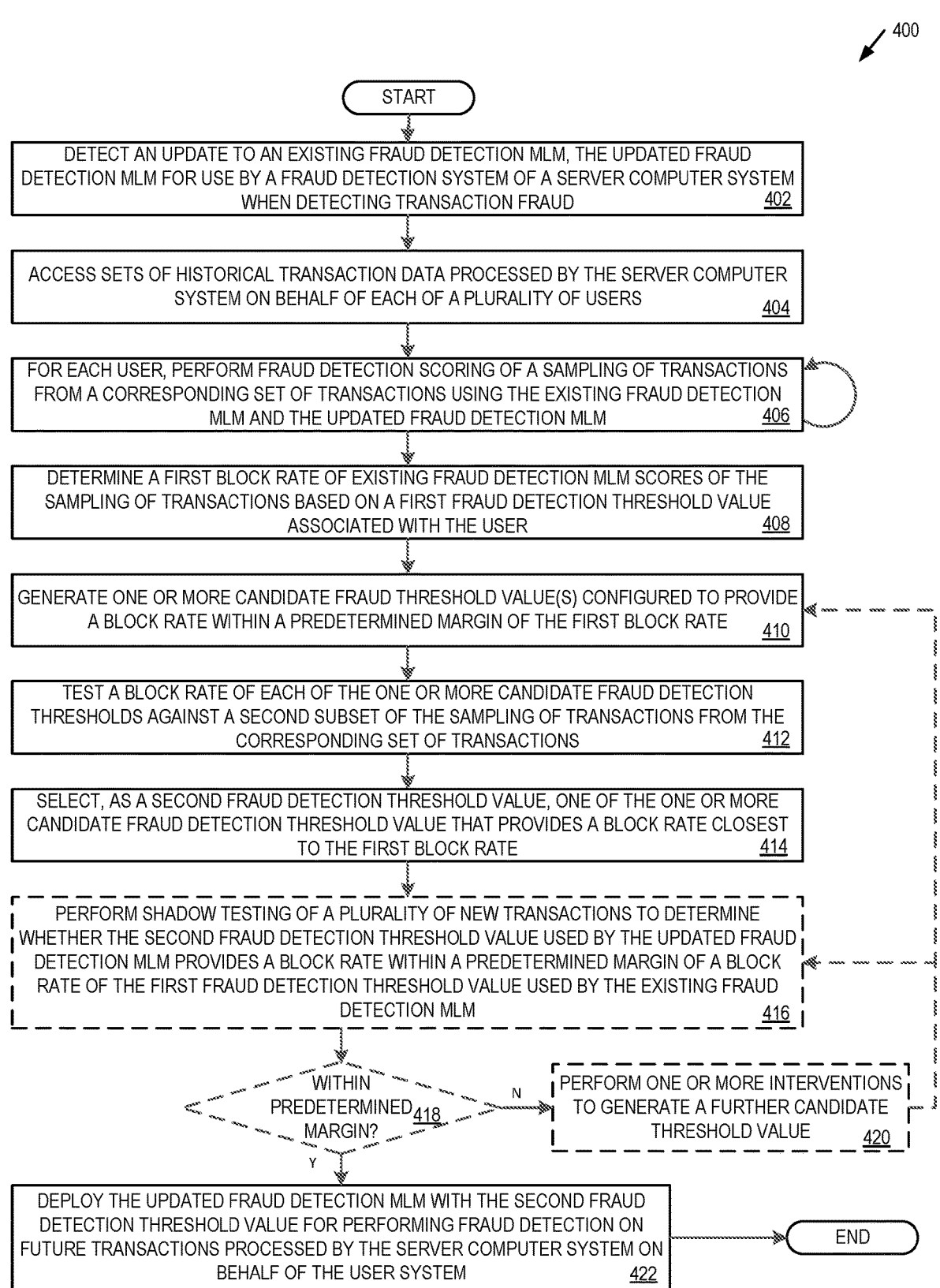
FIG. 4A is a flow diagram of one embodiment of a method for generating and using adjusted fraud detection thresholds for block rate matching in machine learning model based fraud detection.

FIG. 4A is a flow diagram of one embodiment of a method 400 for generating and using adjusted fraud detection thresholds for block rate matching in machine learning model based fraud detection. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform server system 110 or commerce platform server system 200).

Processing logic begins by detecting an update to an existing fraud detection MLM, the updated fraud detection MLM for use by a fraud detection system of a server computer system when detecting transaction fraud (processing block 402). As discussed herein, a fraud detection system may deploy one or more fraud detection MLMs, and one or more of these may be updated, revised, replaced, etc. on a periodic basis.

In response to such a detection, and prior to putting the updated fraud detection MLM into production, processing logic access sets of historical transaction data processed by the server computer system on behalf of each of a plurality of users (processing block 404). In embodiments, transaction records are maintained in a transaction data store (e.g., store 204) and include a plurality of transaction parameters. For example, where such transactions are financial processing transactions, the parameters can include amount, date, time, parties, party identifiers, device identifiers, card numbers, account numbers, security credential information, third party information, whether fraud was detected, whether the transaction was declined for non-fraud based reasons, who may have rejected a declined transaction, as well as other relevant transaction parameters.

For each user, processing logic performs fraud detection scoring of a sampling of transactions from a corresponding set of transactions using the existing fraud detection MLM and the updated fraud detection MLM (processing block 406). In embodiments, processing logic may be deployed by a commerce platform server system (e.g., system 110 or 200) that performs various services for a plurality of users. Furthermore, as discussed herein, each user may set their own fraud detection threshold associated with their preferences, risk aversion, philosophy, goals, etc. Thus, blocks 406-424 as discussed herein are performed for each user to account for the user's set/selected threshold, the transactions actually performed on behalf of that user, and other circumstances particular to each user. Furthermore, in embodiments, given the number of users, processing logic may perform the discussed operations as parallel processes distributed among one or more computing resources. Thus, processing logic is able to more efficiently process the operations discussed herein at scale. To avoid obscuring the operations of the described embodiments, blocks 406-424 are discussed from the perspective of a user system, but as noted above, may represent one of a plurality of user systems, with corresponding processes distributed among computing machines and performed in parallel.

Furthermore, since each user may be associated with a large quantity of transactions, in embodiments, a sampling is used for the processes discussed herein. In embodiments, a quantity of random transactions are selected from among all available transactions associated with user system. Furthermore, transactions over a period of time (e.g., transactions occurring within a prior week, month, 3 months, 6 months, etc.) are selected, for example as recent transaction may best reflect a current block rate. In embodiments, the quantity may be set at a number of transactions to ensure a sufficient number of transactions are user to obtain relevant results (e.g., such as a number that ensures statistically significant detection of variations). Thus, by using a sampling, processing resources are conserved by not performing operations on all transactions, while still maintaining sufficient accuracy.

Processing logic determine a first block rate of existing fraud detection MLM scores of the sampling of transactions based on a first fraud detection threshold value associated with the user (processing block 408). The first block rate is the total number of transactions blocked divided by the total number of transactions. In embodiments, the first block rate is formed based on the sampled transactions.

Processing logic generates one or more candidate fraud threshold value(s) configured to provide a block rate within a predetermined margin of the first block rate (processing block 410). In embodiments, the one or more candidates' thresholds are generated to attempt to match the first block rate within the predetermined margin to ensure a consistent block rate when the updated MLM(s) are put into production. An embodiment of generating the one or more candidate fraud threshold value(s) is discussed below in FIG. 4B.

Processing logic then tests a block rate of each of the one or more candidate fraud detection thresholds against a second subset of the sampling of transactions from the corresponding set of transactions (processing block 412). In an embodiment, the second subset may be a different set of transactions from which one or more of the generated candidate fraud threshold value(s) were generated. The testing determines, on the different transactions the block rates achieved by the corresponding candidates. In an embodiment, for example, where candidates are generated using a first set of transactions (e.g., transactions from a first 2 months of a 3-month period), then a held out set of transactions not used to generate the candidate (e.g., the last month of the three-month period) may be used to test block rates. From the testing, processing logic selects, as a second fraud detection threshold value, one of the one or more candidate fraud detection threshold value that provides a block rate closest to the first block rate (processing block 414). In embodiments, a closes match is therefore selected as the second fraud detection threshold value.

In some embodiments, optionally as shown in dashed line, processing logic may further perform shadow testing of a plurality of new transactions to determine whether the second fraud detection threshold value used by the updated fraud detection MLM provides a block rate within a predetermined margin of a block rate of the first fraud detection threshold value used by the existing fraud detection MLM (processing block 416). In embodiments, the shadow testing is a live testing of new transactions that occurs in parallel or offline on a periodic basis over a period of time after the second fraud detection threshold value is selected. That is, the second, updated MLM(s) are not deployed, nor is the second fraud detection threshold value. Instead, a period of testing live transactions is performed to determine whether the block rate of the second fraud detection threshold value applied to the scoring of the second MLM is within predetermined margin (processing block 418). The margin may be a percentage (e.g., within x %), a number of transactions (e.g., no more than y disparate decision), a statistical measure (e.g., decisions with z standard deviations), or some other margin that is used to ensure consistency of block rate.

When the block rate of the second fraud detection threshold value applied to the scoring of the second MLM is not within the predetermined margin, processing logic performs one or more interventions to generate a further candidate threshold value (processing block 420). In an embodiment, this may include generating a warning or notification sent to a human operator to manually adjust a candidate threshold value. In another embodiment, the process may return to block 410 to regenerate candidates on a new sampling of transactions. In either embodiment, the further candidate threshold value is vetted/testing to ensure that it satisfies the deployment condition of providing a block rate satisfying the predetermined margin. Furthermore, since the processes herein are performed for a plurality of users, in embodiments, all users for which intervention is needed are resolved before proceeding to block 422, discussed below.

When the block rate of the second fraud detection threshold value applied to the scoring of the second MLM is within the predetermined margin, processing logic deploys the updated fraud detection MLM with the second fraud detection threshold value for performing fraud detection on future transactions processed by the server computer system on behalf of the user system (processing block 422). Thus, the second MLM can be deployed, and when paired with the second fraud detection threshold values, provides consistent block rates for transaction fraud detection.

Figure 4B:
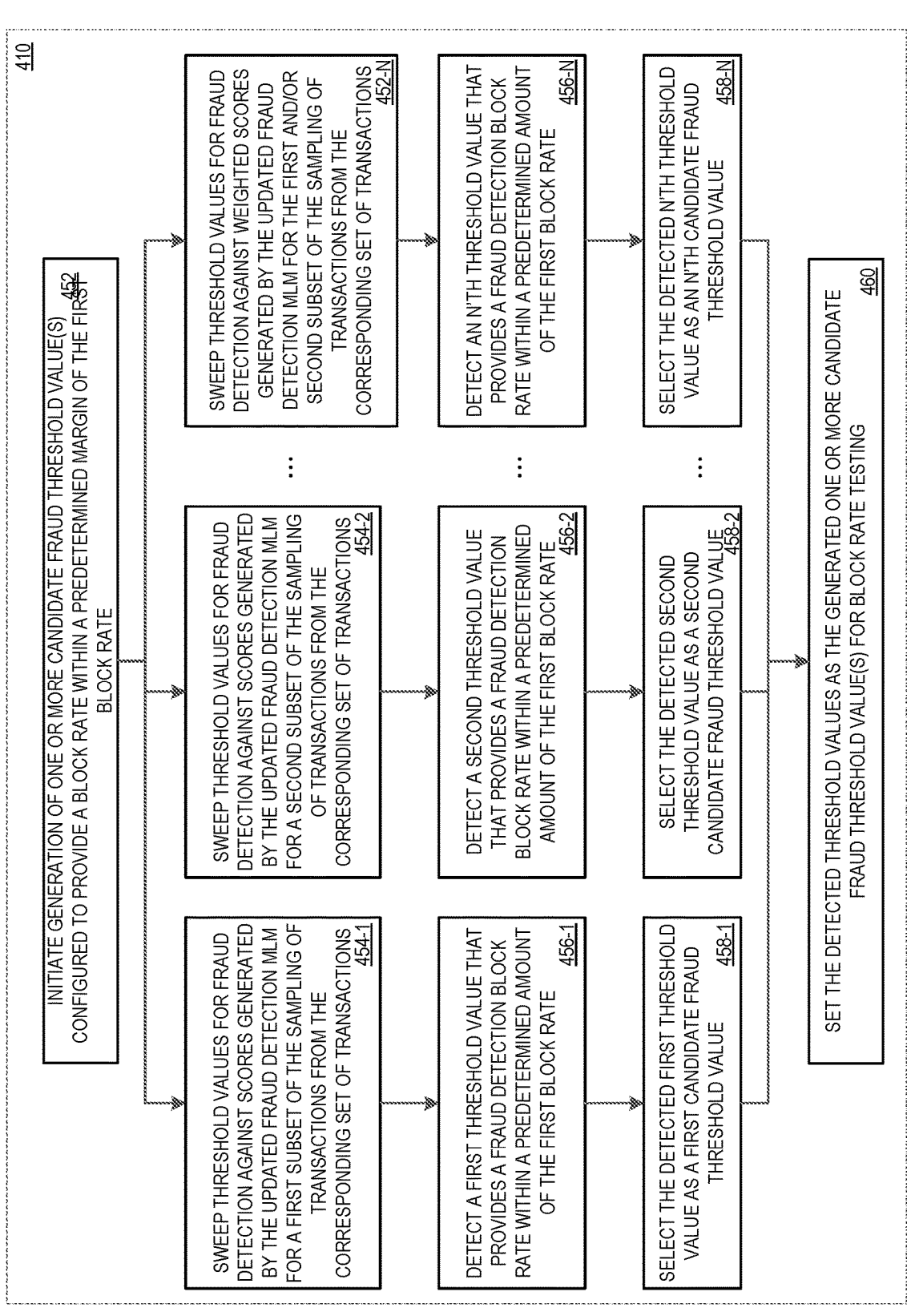
FIG. 4B is a block diagram of one embodiment of a method for generating candidate fraud detection thresholds.

FIG. 4B is a block diagram of one embodiment of a method for generating candidate fraud detection thresholds. The method of FIG. 4B expands on the processing operations of block 410 of FIG. 4A, and is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform server system 110 or commerce platform server system 200).

Processing logic begins by initiating generation of one or more candidate fraud threshold value(s) configured to provide a block rate within a predetermined margin of the first block rate (processing block 452).

Processing logic then generates a plurality of candidate threshold values using different techniques, as discussed herein and as will be discussed in greater detail below.

In an embodiment, processing logic sweeps threshold values for fraud detection against scores generated by the updated fraud detection MLM for a first subset of the sampling of transactions from the corresponding set of transactions (processing block 454-1). Sweeping, as discussed herein, is a process of testing potential threshold values over a range of potential threshold values until a satisfactory value is found, as discussed below. For example, sweeping may involve selecting an existing threshold value as a test value, performing testing of block rate, and if needed, using the deficiency (e.g., too much blocking, too little blocking) to inform the next selection. Techniques for performing this sweeping include, for example, a database table join on an equality of proportion condition, as well as other sweeping techniques. The first subset, in embodiments, is a set of transactions from a first period of the sampling (e.g., the first i transactions within the sampling, the first transactions over period j of the sampling, etc.).

Processing logic then detects a first threshold value that provides a fraud detection block rate within a predetermined amount of the first block rate (processing block 456-1). The first threshold value, for example, may be that which provides a block rate within the predetermined margin of the first block rate, discussed above. Processing logic selects the detected first threshold value as a first candidate fraud threshold value (processing block 458-1).

In an embodiment, processing logic also sweeps threshold values for fraud detection against scores generated by the updated fraud detection MLM for a second subset of the sampling of transactions from the corresponding set of transactions (processing block 454-2). The second subset is a different set of transactions as that used to form the fir candidate fraud threshold value. For example, if there are N transactions within the sampling of transaction, the second submit may be transactions i+1 through N, a subset of the N transactions occurring at period j+1 to a period end, etc. Processing logic then detects a second threshold value that provides a fraud detection block rate within a predetermined amount of the first block rate (processing block 456-2). Processing logic selects the detected second threshold value as a second candidate fraud threshold value (processing block 458-2).

In an embodiment, processing logic further sweeps threshold values for fraud detection against weighted scores generated by the updated fraud detection MLM for the first and/or second subset of the sampling of transactions from the corresponding set of transactions (processing block 454-N). In embodiments, score weighting may be employed to account for additional sources of fraud detection. For example, fraud unrelated to transaction parameters may exists, such as during a period of a card testing attack. Similarly, transactions may be declined by third parties (e.g., card issuers, banks, etc.). In embodiments, the MLM(s) 234 discussed above may include models that detect whether a transaction occurred on a day in which card testing was ongoing, whether an issuer was likely to decline a transaction, as well as other scenarios in which a transaction may be blocked. To account for these additional blocking events, the fraud detection score may be weighted by such additional MLM based scores. For example, the final fraud detection score at block 452-N may be $final\_score=MLM\_fraud\_score*w1*w2* \ . \ . \ . \ *wn$, where each w is a weight generated from an additional predictive factor, such as MLM score indicative of card testing with optional additional weighting applied (e.g., an adjustment as to how much influence the individual weight is given). The weighting may then be applied during the sweeping process discussed above. Processing logic then detects an n'th threshold value that provides a fraud detection block rate within a predetermined amount of the first block rate (processing block 456-N). Processing logic selects the detected n'th threshold value as an n'th candidate fraud threshold value (processing block 458-N).

Processing logic then sets the detected threshold values as the generated one or more candidate fraud threshold value(s) for block rate testing (processing block 460). By selecting the various threshold values from the different transaction subsets and/or threshold generation methods, technical challenges related to sampling bias, error, etc. related to selecting testing data from historical and/or live fraud detections may be avoided. Furthermore, different thresholds may more accurately provide consistent future/live block rates. By providing a plurality of candidates, more accurate block rate matching can therefore be achieved. Processing logic of block 410 would then proceed to block 412 of FIG. 4A as discussed above with the one or more candidate fraud threshold value(s).

Figure 5:
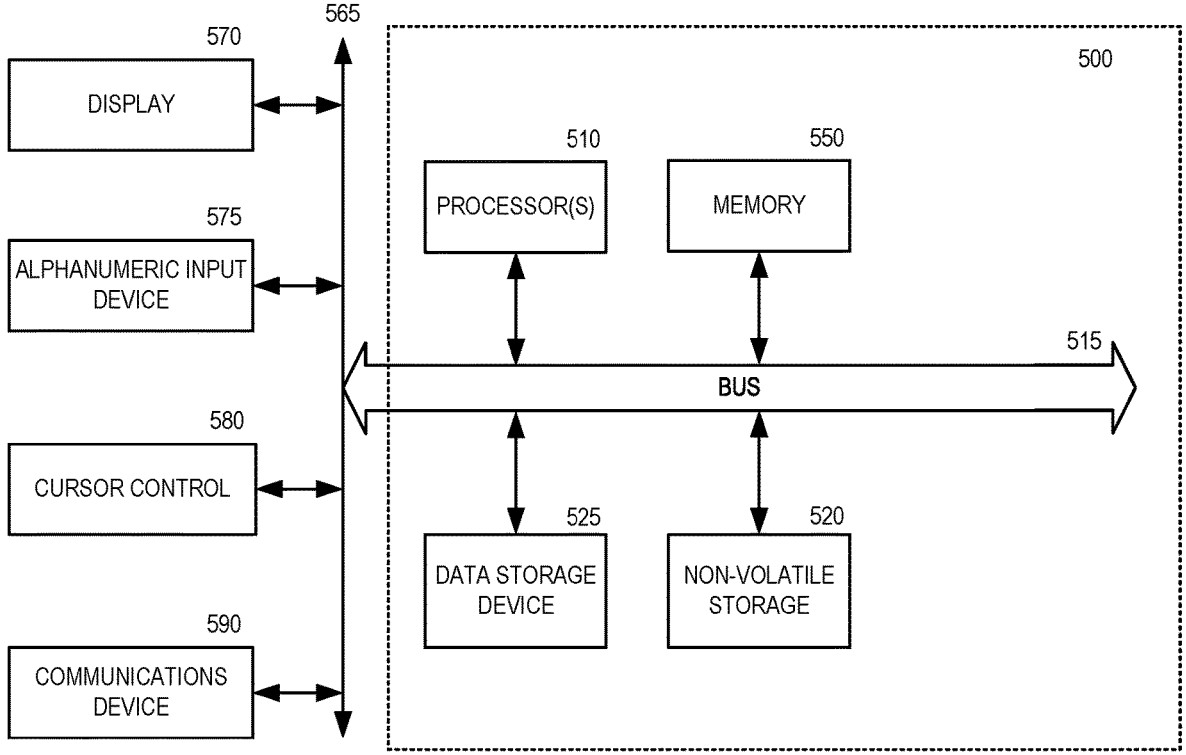
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform server system, a merchant server system, a user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A system, comprising:

a transaction system comprising a transaction data store, a transaction manager, a fraud detection computer system comprising a first machine learning (ML) model, and a first processor and a first memory storing executable instructions that when executed by the first processor causes the first processor to perform operations, comprising:

continuously receiving a first set of transactions from a network, receiving from a computer system of a merchant a threshold, storing the threshold and a first block rate, storing the first set of transactions for the merchant in the transaction data store, receiving, via the transaction manager, a first transaction associated with the merchant from the network, and sending first parameters associated with the first transaction to the fraud detection computer system, and adding the received first transaction to the first set of transactions stored in the transaction data store;

the fraud detection computer system comprising a second processor and second memory storing executable instructions that when executed by the second processor causes the second processor to perform operations, comprising:

generating a score for the received first transaction utilizing the received first parameters and the first ML model and denying or approving the first transaction by comparing the score to the threshold;

a communication interface connected to the transaction system, the fraud detection computer system and a block rate matching system;

the block rate matching system comprising a fraud model testing manager, a block rate testing manager, a third processor and a third memory storing executable instructions that when executed by the third processor causes the third processor to perform operations, comprising:

storing a second ML model, and, via the fraud model testing manager:

accessing, via the fraud model testing manager and over the communication interface, the first set of transactions in the transaction data store, generating, via the fraud model testing manager, a plurality of candidate thresholds and scoring, via the fraud model testing manager for each candidate threshold in the plurality of candidate thresholds, each transaction in the set of transactions, utilizing, via the fraud model testing manager, the second ML model and determining, via the fraud model testing manager, whether each transaction in the set of transactions would be approved or denied, accessing, via the fraud model testing manager over the communication interface, transactions of the received first set of transactions received after the plurality of candidate thresholds were generated, applying, via the fraud model testing manager, each of the generated candidate thresholds to transactions received after the plurality of candidate thresholds were generated, and determining, via the fraud model testing manager for each of the plurality of candidate thresholds, a second block rate, by dividing a number of transactions that were blocked by a number of received transactions, determining, via the fraud model testing manager, an adjusted threshold from the plurality of candidate thresholds based on the first block rate and the second block rate, and communicating, via the block rate testing manager over the communication interface, the second model and the adjusted threshold to the fraud detection computer system;

wherein the first memory stores further executable instructions that when executed by the first processor causes the first processor to perform further operations, comprising:

receiving, via the transaction manager, a second transaction associated with the merchant from the network, sending, via the transaction manager, second parameters associated with the second transaction to the fraud detection computer system, and storing, via the transaction manager, the received second transaction in the transaction data store; and wherein the second memory stores further executable instructions that when executed by the second processor causes the second processor to perform further operations, comprising:

replacing, the first ML model with the communicated second ML model and the threshold with the communicated adjusted threshold; and generating a score for the received second transaction utilizing the received second parameters and the communicated second ML model, and denying or approving the second transaction by comparing the score generated utilizing the second parameters and the communicated second ML model to the communicated adjusted threshold.

2. The system of claim 1, wherein the third memory stores additional executable instructions that when executed by the third processor causes the third processor to perform further operations, comprising, via the fraud model testing manager, accessing, in the transaction data store, a set of historical transaction data;

performing fraud detection scoring of a sampling of transactions from the set of historical transaction data using the first ML model; and determining the first block rate of the first ML model based on a value of the threshold.

3. The system of claim 2, wherein the determining via the fraud model testing manager the value of the adjusted threshold further comprises:

performing fraud detection scoring of at least a portion of the sampling of transactions using the second ML model;

generating the plurality of candidate thresholds;

determining a candidate block rate of each of the plurality of candidate thresholds against a subset of the sampling of transactions;

selecting, as the value of the adjusted threshold, one of the plurality of candidate thresholds that provides a closest block rate to the first block rate; and deploying the second ML model with the value of the adjusted threshold for performing fraud detection on future transactions processed by system.

4. The system of claim 3, wherein the generating via the fraud model testing manager the plurality of candidate thresholds further comprises:

sweeping first potential threshold values for fraud detection against scores generated by the second ML model for a first subset of the sampling of transactions;

detecting a first potential threshold value from among the first potential threshold values that provides a first candidate block rate within a predetermined amount of the first block rate; and selecting the detected first potential threshold value as a first candidate threshold.

5. The system of claim 4, wherein the generating via the fraud model testing manager the plurality of candidate thresholds further comprises:

sweeping second potential threshold values for fraud detection against scores generated by the second ML model for a second subset of the sampling of transactions;

detecting a second potential threshold value from among the second potential threshold values that provides a second candidate block rate within the predetermined amount of the first block rate; and selecting the detected second potential threshold value as a second candidate threshold.

6. The system of claim 5, wherein the generating via the fraud model testing manager the plurality of candidate thresholds further comprises:

sweeping third potential threshold values for fraud detection against weighted scores generated by the second ML model for the first or second subset of the sampling of transactions;

detecting a third potential threshold value from among the second potential threshold values that provides a third candidate block rate within the predetermined amount of the first block rate; and selecting the detected third potential threshold value as a third candidate threshold.

7. The system of claim 6, wherein the weighted scores are generated by applying one or more weightings to scores generated by the second ML model.

8. The system of claim 6, wherein the third memory stores additional executable instructions that when executed by the third processor causes the third processor to perform operations, comprising:

determining a block rate of each of the first, second, and third candidate thresholds against the second subset of the sampling of transactions; and selecting, as the adjusted threshold, one of the first, second, and third candidate thresholds that provides the closest block rate to the first block rate.

9. The system of claim 6, wherein the first subset of the sampling of transactions comprising transactions from one of a plurality of periods of time of the sampling of transactions, and the second subset of the sampling of transactions comprising transactions from a different one of the plurality of periods of time of the sampling of transactions.

10. The system of claim 1, wherein the third memory stores additional executable instructions that when executed by the third processor causes the third processor to perform operations, comprising:

wherein prior to communicating, via the block rate testing manager over the interface, the second model and the adjusted threshold to the fraud detection computer system and replacing, the first ML model with the communicated second ML model and the threshold with the communicated adjusted threshold, determining whether the adjusted threshold when used with the second ML model to detect transaction fraud provides a shadow testing block rate within a predetermined margin of the first block rate of the threshold used by the first ML model by performing shadow testing, by the fraud model testing manager, of a plurality of new transactions;

when the shadow testing block rate of the adjusted threshold used with the second ML model is within the predetermined margin, deploying the second ML model using the adjusted threshold; and when the shadow testing block rate of the adjusted threshold used with the second ML model fails to be within the predetermined margin, initiating a modification of the threshold used by the second ML model.

11. The system of claim 1, wherein the second ML model is one of a new ML model, an updated ML model, or a retrained version of the first ML model.

12. A method performed by a system, comprising:

continuously receiving, by a transaction system, a first set of transactions from a network, receiving, by the transaction system, from a computer system of a merchant a threshold, storing, by the transaction system, the threshold and a first block rate, storing, by the transaction system, the first set of transactions for the merchant in a data store of the transaction system, receiving, by a transaction manager of the transaction system, a first transaction associated with the merchant from the network, and sending, by the transaction system, first parameters associated with the first transaction to a fraud detection computer system, and adding the received first transaction to the first set of transactions stored in the transaction data store;

generating, by the fraud detection computer system, a score for the received first transaction utilizing the received first parameters and a first machine learning (ML) model and denying or approving, by the fraud detection computer system, the first transaction by comparing the score to the threshold, wherein the fraud detection computer system includes the first ML model, and wherein the transaction system includes the fraud detection computer system;

storing, by a block rate matching system, a second ML model;

accessing, by a fraud model testing manager of the block rate matching system via a communication interface, the first set of transactions in the transaction data store, generating, by the fraud model testing manager, a plurality of candidate thresholds and scoring, by the fraud model testing manager for each candidate threshold in the plurality of candidate thresholds, each transaction in the set of transactions, utilizing, by the fraud model testing manager, the second ML model and determining whether each transaction in the set of transactions would be approved or denied, wherein the communication interface is connected to the transaction system, the fraud detection system and the block rate matching system, accessing, by the fraud model testing manager via the communication interface transactions of the received first set of transactions received after the plurality of candidate thresholds were generated, applying, by the fraud model testing manager, each of the generated candidate thresholds to transactions received after the plurality of candidate thresholds were generated, and determining, by the fraud model testing manager for each of the plurality of candidate thresholds, a second block rate, by dividing a number of transactions that were blocked by a number of received transactions, determining, by the fraud model testing manager, an adjusted threshold from the plurality of candidate thresholds based on the first block rate and the second block rate, and communicating, by a block rate testing manager of the block rate matching system via the communication interface, the second model and the adjusted threshold to the fraud detection computer system;

receiving, by the transaction manager, a second transaction associated with the merchant from the network, sending, by the transaction manager, second parameters associated with the second transaction to the fraud detection computer system, and storing, by the transaction manager, the received second transaction in the data store;

replacing, by the fraud detection computer system, the first ML model with the communicated second ML model and the threshold with the communicated adjusted threshold; and generating, by the fraud detection computer system, a score for the received second transaction utilizing the received second parameters and the communicated second ML model, and denying or approving, by the fraud detection computer system, the second transaction by comparing the score generated utilizing the second parameters and the communicated second ML model to the communicated adjusted threshold.

13. The method of claim 12, further comprising:

accessing, by the fraud model testing manager, in the transaction data store, a set of historical transaction data; performing fraud detection scoring of a sampling of transactions from the set of historical transaction data using the first ML model; and determining, by the fraud model testing manager, the first block rate of the first ML model based on a value of the threshold.

14. The method of claim 12, wherein the second ML model is one of a new ML model, an updated ML model, or a retrained version of the first ML model.

15. The method of claim 12, wherein the threshold used by the first ML model is set by a user of the merchant.

* * * * *